United States Patent [19]
Faber et al.

[11] Patent Number: 5,641,332
[45] Date of Patent: Jun. 24, 1997

[54] FILTRAION DEVICE WITH VARIABLE THICKNESS WALLS

[75] Inventors: Margaret K. Faber; Rodney I. Frost, both of Corning, N.Y.

[73] Assignee: Corning Incorporated, Corning, N.Y.

[21] Appl. No.: 575,307

[22] Filed: Dec. 20, 1995

[51] Int. Cl.$^6$ .......................... B01D 39/20; B01D 53/22
[52] U.S. Cl. .................... 55/523; 55/524; 96/4; 210/321.89
[58] Field of Search .......................... 55/523, 524; 96/4, 96/7, 8; 210/247, 321.8, 321.89

[56] References Cited

U.S. PATENT DOCUMENTS

| | | | |
|---|---|---|---|
| 4,233,351 | 11/1980 | Okumura | 428/116 |
| 4,243,536 | 1/1981 | Prölss | 96/7 X |
| 4,390,355 | 6/1983 | Hammond et al. | 55/523 |
| 4,423,090 | 12/1983 | Hammond et al. | 427/181 |
| 4,550,005 | 10/1985 | Kato | 264/177 R |
| 4,643,749 | 2/1987 | Miura | 55/523 |
| 4,781,831 | 11/1988 | Goldsmith | 210/247 |
| 4,835,044 | 5/1989 | Hattori et al. | 428/116 |
| 4,979,889 | 12/1990 | Frost | 425/192 R |
| 5,108,601 | 4/1992 | Goldsmith | 210/247 |
| 5,260,035 | 11/1993 | Lachman et al. | 55/523 X |
| 5,454,947 | 10/1995 | Olapinski et al. | 55/523 X |

FOREIGN PATENT DOCUMENTS

| | | | |
|---|---|---|---|
| 0 294 106 B1 | 12/1988 | European Pat. Off. | |
| 63-051923 | 3/1988 | Japan | 96/7 |

*Primary Examiner*—Robert Spitzer
*Attorney, Agent, or Firm*—Timothy M. Schaeberle

[57] ABSTRACT

This invention is directed at a cross-flow filtration device for receiving a feed stock and for separating the feed stock into filtrate and retentate, comprising a multicellular monolith structure having a central longitudinal axis and a peripheral surface. The monolith structure has both an inlet and outlet end face and a matrix of porous walls which define a plurality of cells; these mutually parallel cells extending longitudinally between the inlet and outlet end faces. The cells exhibit a uniform transverse cross section throughout each respective cell's length and each cell's cross-section and shape is variable when compared to at least one other cell such that all of the cells of the structure exhibit an equivalent hydraulic diameter. Lastly, the monolith structure's cells exhibit an increasing aggregate wall thickness in at least one direction as the cells approach the peripheral surface.

21 Claims, 3 Drawing Sheets

FILTRAION DEVICE WITH VARIABLE THICKNESS WALLS

This invention relates to an improved cross-flow filtration device for separating a feed stock into filtrate and retentate, and more particularly to such a device having a matrix of porous walls defining a plurality of constant hydraulic diameter cells exhibiting an increasing aggregate wall thickness as the cells advance in at least one direction from the central perpendicular axis to the peripheral surface.

BACKGROUND OF THE INVENTION

There are a multitude of filtration devices which separate a feed stock into filtrate and retained suspended matter which is too large to pass through the pore structures of the filter. A straight-through filter retains the suspended matter on the filter surface or within the filter matrix and passes only the filtrate. Cross-flow filters operate with tangential flow across the filter surface to sweep away suspended matter unable to pass through the filter surface pores. Cross-flow filters provide for the continuous extraction of retentate, or concentrated suspended matter, from one portion of the device and continuous extraction of filtrate from another portion.

Cross-flow filters can be constructed using multiple passageway, porous monoliths. Such monoliths can have tens of thousands of passageways extending through them, with the passageways normally parallel and uniformly spaced. When in use the feedstock is introduced under pressure at one end of the monolith, flows in parallel through the passageways, and a portion is withdrawn as retentate at the downstream end of the device, while a second portion passes through the membrane and porous monolith walls to exit at the periphery of the monolith.

Filtrate which passes into the porous monolith walls separating the passageways combines and flows through the walls toward the periphery of the monolith, and is removed through the outer skin of the monolith. The resistance to flow in the tortuous flow path of the monolith passageway walls can severely limit filtration capacity, and for this reason cross-flow filters based on large diameter high surface area, multiple passageway, porous monoliths are not found in wide commercial use.

Membrane devices utilize a semipermeable membrane to separate filtrate, also called permeate, from retentate. There is a multitude of different pressure driven membrane devices which separate and concentrate particles, colloids, macromolecules, and low molecular weight molecules. Membranes generally require a mechanical support which can be integral with the membrane, or separate. For example, membranes can be coated onto, or simply mechanically supported by, a porous support material.

Multiple-passageway, porous monoliths, e.g., honeycomb substrates, can be especially useful as membrane supports. In this instance membranes are applied to the passageway walls, which serve as both a mechanical support and as the flow path for filtrate removal to a filtrate collection zone. The walls of the substrate not only act as the supports for the membranes, but also serve as the egress path for the filtrate or permeate. In these pressure driven separation processes, the feed is forced through the small pores of the membranes that are supported on the walls of the honeycomb. Once the fluid has passed through the small pore size of the membranes (the path of most resistance), the filtered material enters the relatively larger pore of the walls. The amount of filtrate material that can pass from the innermost cell or cells, to the outside of the substrate, is limited by the wall porosity and thickness. If the walls are not sufficiently thick or sufficiently porous, the total volume of filtrate cannot be carried through the walls to the skin, and hence to the outside of the substrate. This results in a failure to use all of the available membrane surface area. That is, all or most of the feed that passes through the innermost cell or cells may simply pass through the support as retentate, without any portion passing through the membranes supported on those cells.

SUMMARY OF THE INVENTION

Accordingly, the present invention described herein is a cross-flow filtration device for receiving a feed stock and for separating the feed stock into filtrate and retentate which overcomes the aforementioned flow problems and allows all of the filtrate volume to be carried through the porous walls to the outer surface of the filter device. The filtration device described herein is comprised of a multicellular monolith structure having a central longitudinal axis and a peripheral surface. Furthermore, the monolith structure has both an inlet and outlet end face and a matrix of porous walls which define a plurality of cells; these mutually parallel cells extending longitudinally between the inlet and outlet end faces. The cells exhibit a uniform transverse cross section throughout each respective cell's length and each cell's cross-section and shape is variable when compared to at least one other cell such that all of the cells of the structure exhibit an equivalent hydraulic diameter. Lastly, the walls of the cells, advancing in at least one direction from the central longitudinal axis towards the peripheral surface, exhibit an increasing aggregate wall thickness.

One embodiment of the filtration device comprises a cylindrical monolith structure having a matrix of radially-extending and circumferential porous walls. The radially extending walls exhibit an increasing thickness as measured from the central longitudinal axis towards the peripheral surface. Each successive circumferential wall exhibits an increased thickness as the walls advance from the central longitudinal axis towards the peripheral surface.

One essential advantage of this inventive filtration device possessing the "increasing aggregate wall thickness" concept is that the walls of the honeycomb structure are able to accommodate the permeate flow from all of the cells of the support, and in return all the available membrane surface area is used. Furthermore, the constant hydraulic diameter characteristic assures that each cell carries an equivalent volume of feedstock thereby ensuring that all of the available membrane surface area will be fully utilized; ultimately, a filtration device of increased efficiency.

DETAILED DESCRIPTION OF THE INVENTION

Figure 1:
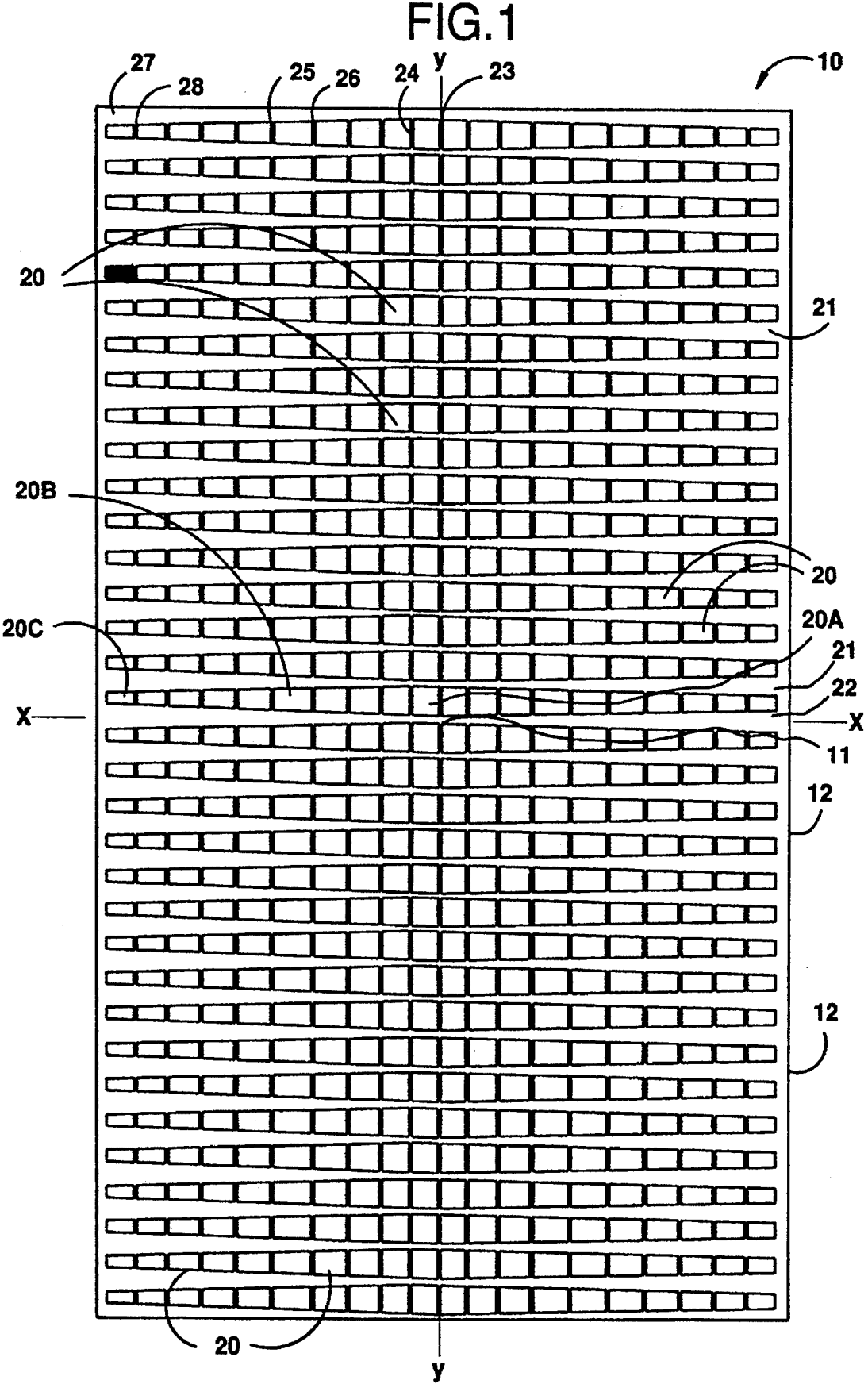
FIG. 1 illustrates a cross section through a square embodiment of the inventive filtration device.

Referring now to FIG. 1, the present invention is generally directed at a cross-flow filtration device for receiving a feed stock and for separating the feed stock into filtrate and retentate. The filtration device comprises a multicellular monolith structure 10, a rectangular structure in this embodiment, possessing both an inlet and outlet end face, one of which is shown, and having a central longitudinal axis 11 and a peripheral surface 12; the axis 11 defined as the axis perpendicular to the plane formed by, and running through the intersection of, the x and y axis as shown in FIG. 1. The structure possesses a matrix of porous walls defining a plurality of cells 20 extending longitudinally and mutually parallel therethrough. Each of the cells 20, exhibits an equivalent hydraulic diameter, a uniform transverse cross section throughout their length and a variable cross-section and shape when compared to at least one other cell.

The hydraulic diameter of any conduit such as a cell, whether carrying a liquid or gas, is defined as four times the transverse cross-sectional area divided by the wetted or contacted perimeter of the opening. Stated another way—two differently shaped cylinders will exhibit the same resistance to flow through them (liquid or gas), if they exhibit the same hydraulic diameter.

Furthermore, as cells 20 advance in at least one direction from the central longitudinal axis to the peripheral surface they exhibit an increasing "aggregate wall thickness" i.e., the total combined thickness of the four walls which define each cell 20. In the structure depicted in FIG. 1 it can be seen that there is an increase in the aggregate wall thickness for the cells which advance in all directions, from the central longitudinal axis to the peripheral surfaces except for the direction which is directly along the y-axis. For example, the aggregate wall thickness of central longitudinal axis-proximate cell designated 20 A—combined thickness of walls 21, 22,23 and 24, is less than intermediate cell designated 20 B—combined thickness of walls 21, 22, 25, 26, which is less then peripherally-proximate cell designated 20 C—combined thickness of walls 21,22,27, 28.

Figure 2:
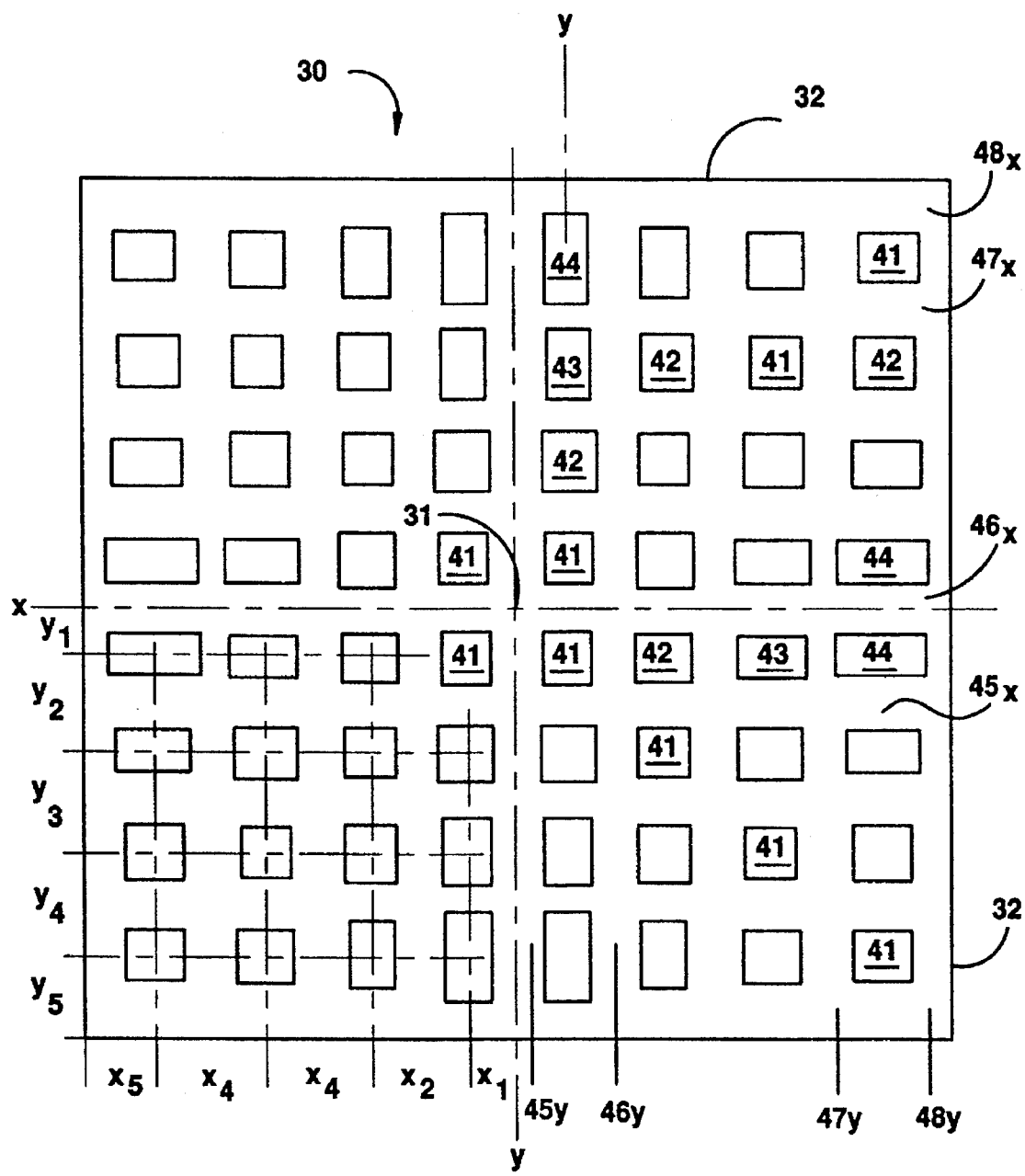
FIG. 2 illustrates a cross section through another square embodiment of the inventive filtration device.

Referring now to FIG. 2, shown is another embodiment of a filtration device comprising a multicellular monolith square structure 30, possessing both an inlet and outlet end face, one of which is shown, and having a central longitudinal axis 31 and a peripheral surface 32; the axis 31 defined as the axis perpendicular to the plane formed by, and running through the intersection of, the x and y axis as shown in FIG. 2. Again, the structure possesses a matrix of porous walls defining a plurality of cells extending longitudinally and mutually parallel therethrough. As described above, each of the cells, 41–44 exhibits an equivalent hydraulic diameter, a uniform transverse cross section throughout their length and a variable cross-section and shape when compared to at least one of the other cells; specifically, the cells having four distinctive shapes 41, 42, 43 and 44.

The embodiment depicted in FIG. 2 differs from the embodiment illustrated in FIG. 1 in that as cells 41–44 advance in all directions from the central longitudinal axis 31 to the peripheral surface 32 they exhibit an increasing "aggregate wall thickness". For example, the aggregate wall thickness of cell 41, proximate to the central longitudinal axis—combined thickness of walls 45Y, 46Y, 45X and 46X defining cell 41, is less than the aggregate cell thickness of the following three cells: (1) cell 41 proximate the peripheral surface 32—combined thickness of walls 47X, 48X, 47Y and 48Y defining cell 41; (2) cell 44 proximate the peripheral surface 32 and located along the X-axis—combined thickness of walls 45X, 46X, 47Y and 48Y defining cell 44; and, (3) cell 44 proximate the peripheral surface and located along the Y-axis—combined thickness of walls 45Y, 46Y, 47X and 48X defining cell 44.

Figure 3:
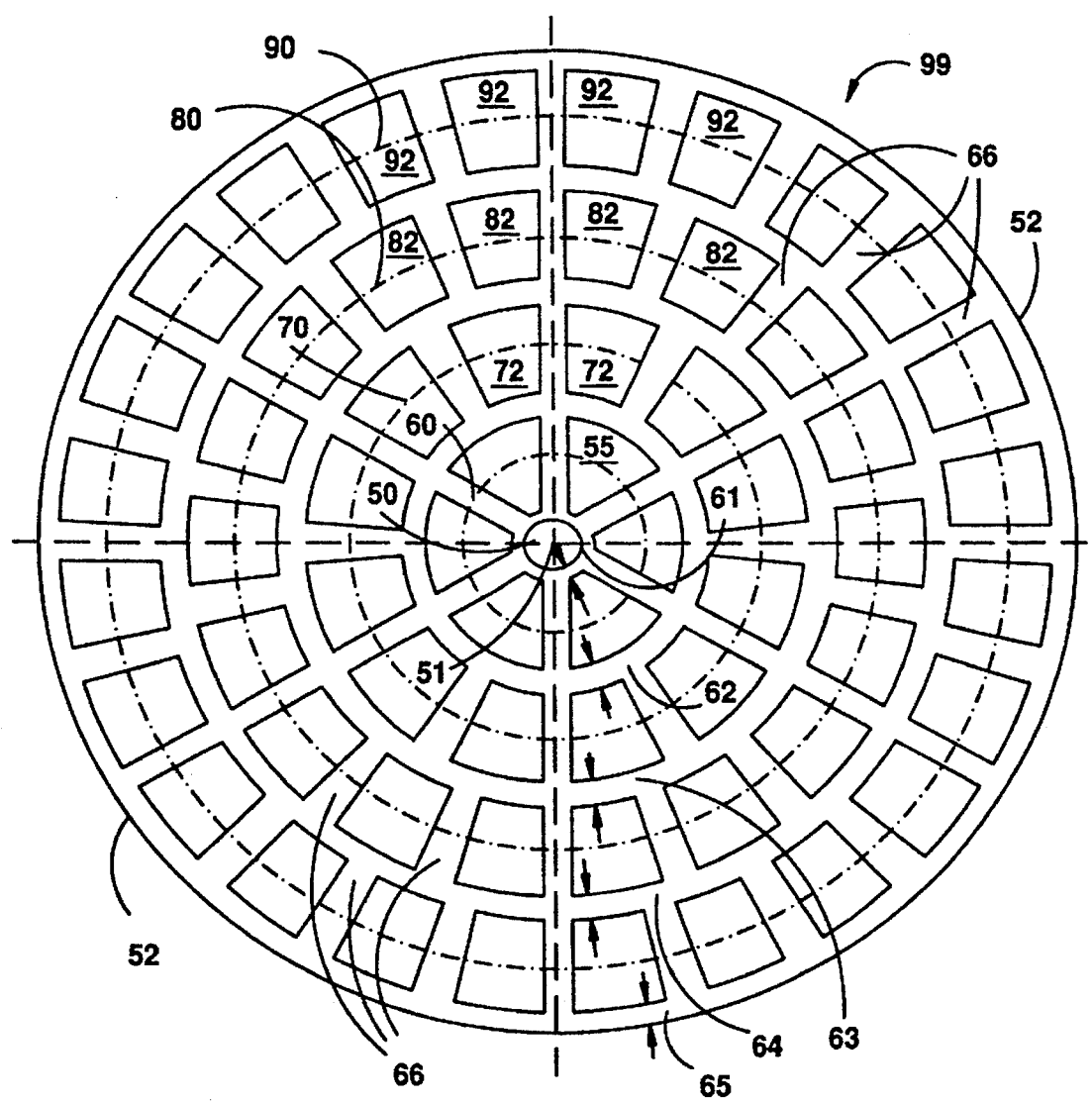
FIG. 3 illustrates a cross section through a circular embodiment of the inventive filtration device.

Referring now to FIG. 3, depicted therein is another embodiment of the filtration device comprised of a cylindrical and multicellular monolith structure 99 which has a central longitudinal axis 51 and a peripheral surface 52. The monolith structure 99 possesses a matrix of radially extending 66 and circumferential 61–65 porous walls which define a plurality of cells. Numerals 50, 60, 70, 80 and 90 each designates a ring or zone of cells: (1) 50 denotes the central longitudinal axis 51 cell zone and comprises one circular cell 50 designated the Zone AA cell; (2) 60 denotes the radially innermost zone of cells 62, designated Zone A cells, while 70 indicates a next radially innermost zone of cells 72, designated Zone B cells; and, (3) 90 denotes the radially outermost zone of cells 92, designated Zone D cells, while 80 designates a zone of cells 82 inside the Zone D cells, designated Zone C cells.

Again, each of the cells 50, 55, 72, 82, 92, exhibits a uniform transverse cross section throughout their length, are mutually parallel and extend longitudinally through and between the inlet and outlet end faces of the structure 99. Furthermore, the cross sectional area and shape of each of the cells 50, 55, 72, 82, 92 is varied such that they all exhibit an equivalent hydraulic diameter as defined above.

The radially-extending walls 66 exhibit an increasing thickness, as measured from the central longitudinal axis 51 towards the peripheral surface 52. Each successive circumferential wall exhibits an increased thickness over that circumferential cell wall adjacent to it and located closer to the central longitudinal axis 51, e.g., circumferential wall 62 exhibits an increased thickness over that thickness exhibited by circumferential wall 61. Specifically, the cell walls 61–65 which separate each of the cell zones AA–D (Zone D and the peripheral surface at the outer extreme) increase in thickness. Stated in another way, the thickness increases as the cell walls 66 advance from the central perpendicular axis cell 50 wall 61 to the cell wall 65 located between the peripheral wall 52 and the Zone D cells 92.

The cross-flow filtration devices described above can be fabricated from a variety of porous materials including materials such as glass, ceramics, glass-ceramics, organic polymers, metals, activated carbon and mixtures thereof. Ceramic materials that are especially suitable include those made of cordierite, mullite, clay, talc, zircon, zirconia, zirconates, zirconia-spinel, magnesium alumino-silicates, spinel, alumina, silica, silicates, borides, alumino-silicates, such as, zeolites, porcelains, lithium alumino-silicates, alumina silica, feldspar, titania, fused silica, nitrides, borides, carbides, such as, silicon carbide, silicon nitride, or mixtures thereof. For those applications where a very fine pore size is desired, the preferred material is selected from the group consisting of mullite, alumina and titania.

The monolith structure which forms the filtration device should be formed such that it exhibits a high volume porosity, i.e., a porosity ranging from about 25%–50%, by volume. Additionally, if the monolith structure is to be used in ultrafiltration or microfiltration applications it should possess a relatively large average pore diameter of between about 0.1–10 micrometers; preferably exhibiting an average pore diameter of between about 0.1–5 micrometers. If, on the other hand, the filtration device is to be used in gas separation applications it is desirable that the monolith structure exhibit an average pore diameter of between about 0.1–2 micrometers.

Permselective membranes, selected from the membranes suitable for cross-flow filtration, microfiltration, ultrafiltration, reverse osmosis, gas separations, pervaporation may be applied to the surface of the cells of the aforementioned monolith structure.

For fabrication of the monolith structure as illustrated in FIG. 3, the die as described in U.S. Pat. No. 4,979,889. (Frost et al.) is especially useful, that die patent hereinafter incorporated by reference. Briefly, the die disclosed therein is comprised of a plurality of rigid tubes, each slotted along a portion of its length and each provided, at the die input face, with an integral, radially extending collar. Each collar has a plurality of extending notches uniformly angularly disposed around its periphery, each collar being of different longitudinal thickness and nesting within a counterbore in its next radially outward neighboring or adjacent collar. A plurality of angularly spaced slots run partially longitudinally by each tube. Each slot extends through its respective tube wall, the exterior surface of each tube, except for the radially outermost tube, which is radially spaced from the interior surface of the next adjacent radial outer tube. A rigid holder has a central bore which runs longitudinally through it, the holder opening has a counterbore at an end which receives the radially outermost collar. The bore of the holder is radially spaced from the exterior of the outermost, whereby a plurality of passageways is defined for the passage of an extrudable substance from the notches on the collars to the noncollared ends of the tubes. Lastly, the material to be extruded from the die, to form the monolith structure described herein, is fed into the openings defined by the collar notches and is extruded from the output of downstream ends of the slots in the tubes.

EXAMPLES

Example 1

A square monolith structure possessing 5.91 in. side dimension, exhibiting the cell and wall configuration as illustrated in FIG. 2 and the cell centerline location dimensions indicated as $x_1$–$x_5$ and $y_1$–$y_5$ FIG. 2 and as reported in

TABLE I

| | | | |
|---|---|---|---|
| $x_1$ | 0.3 | $y_1$ | 0.3 |
| $x_2$ | 0.62 | $y_2$ | 0.62 |
| $x_3$ | 0.67 | $y_3$ | 0.67 |
| $x_4$ | 0.79 | $y_4$ | 0.79 |
| $x_5$ | 0.53 | $y_5$ | 0.53 |

Example 2

A monolith structure exhibiting a cell and wall configuration as illustrated in FIG. 3 and exhibiting the dimensions reported in TABLE II would be suitable for use as a filtration device or as membrane support. The structure would exhibit the following dimensions: an approximate diameter of 1.06 in. (27.03 mm), a variable axial length, e.g. 36 in (91.44 cm), an approximate cell density of 78 cells/in$^2$, an open porosity of approximately 43% and a constant hydraulic cell diameter of 0.75 in. Specifically, TABLE II reports the following additional hypothetical dimensions: (1) the hypothetical thickness calculated for the radially extending wall at various locations as the wall extends to the peripheral wall—specifically measured at each of the cell zones A–D as described above; and, (2) the hypothetical calculated thicknesses of the successive circumferential walls as they approach the peripheral wall. An examination of the table reveals that the monolith structure formed with these dimensions would exhibit the inventive features of: (1) a radial extending wall which exhibits an increasing thickness as measured from the central longitudinal axis; and, (2) successive circumferential walls exhibiting an increasing thickness as the peripheral wall is approached. Specifically, the table reports that the circumferential walls' thicknesses increases from 0.02 to 0.05 in. (0.508–1.27 mm), while the radial wall also exhibited the same increase in thickness increase from 0.02 to 0.05 in (0.508–1.27 mm).

TABLE II

| Measurement Location | Radial Wall Thickness | Circumferential Wall | Wall Thickness |
|---|---|---|---|
| Zone A cells | 0.02 in/0.508 mm | Cen. axis–A | 0.020/0.508 mm |
| Zone B cells | 0.03 in/0.762 mm | A–B | 0.025 in/0.635 mm |
| Zone C cells | 0.04 in/1.016 mm | B–C | 0.035 in/0.889 mm |
| Zone D cells | 0.05 in/1.27 mm | C–D | 0.045 in/1.143 mm |
| | | D–periph. wall | 0.05 in/1.27 mm |

Table I, would be suitable for use as a filtration device or as membrane support. Specifically, the structure would exhibit four distinctive cells shapes/sizes, cell designations 41,42, 43, and 44, all exhibiting a hydraulic diameter of 0.40 in. and possessing the following dimensions: (1) cell 41—0.4×0.4 in; (2) cell 42—0.44×0.368 in.; (3) cell 43—0.501×0.333 in.; and (4) cell 44—0.645×0.291 in.

Utilizing the cell centerline location dimensions and the aforementioned cell sizes enables the calculation of the aggregate wall thickness for any desired cell. The aggregate wall thickness of cell 41, proximate to the central longitudinal axis—combined thickness of walls 45Y, 46Y, 45X and 46X of 0.8 in., is less than the aggregate wall thickness of the following three aforementioned cells: (1) cell 41 defined by walls 47X, 48 X, 47Y and 48Y—1.472 in.; (2) cell 44 defined by walls 45X, 46X, 47Y and 48Y—1.0415 in; and, (3) cell 44 defined by walls 45Y, 46Y, 47X and 48X—1.0415 in.

Although the invention has been described with respect to the above illustrated description and example, it may be subjected to various modifications and changes without departing from the scope of the invention. For example, although four-walled cells are described above, cell shapes other than these, such as round or triangular, etc, may be employed.

We claim:

1. A cross-flow filtration device for receiving a feed stock and for separating the feed stock into filtrate and retentate, comprising:

a multicellular monolith structure having a central longitudinal axis and a peripheral surface and having inlet and outlet end faces and a matrix of porous walls defining a plurality of cells extending longitudinally and mutually parallel therethrough between the inlet and outlet end faces;

each of the cells exhibiting an equivalent hydraulic diameter, a uniform transverse cross section throughout their length and a variable cross-section and shape when compared to at least one other cell;

the cells, advancing in at least one direction from the central longitudinal axis towards the peripheral surface, exhibiting an increasing aggregate wall thickness.

2. The filtration device of claim 1 wherein cells advancing in all directions from the central longitudinal axis towards the peripheral surface, exhibit an increasing aggregate wall thickness.

3. The filtration device of claim 1 wherein the monolith structure is cylindrical and comprised of a matrix of radially-extending and circumferential porous walls with each of the radially-extending walls exhibiting an increasing thickness as measured from the central longitudinal axis towards the peripheral surface and each successive circumferential wall exhibiting an increased thickness as the walls advance from the central longitudinal axis towards the peripheral surface.

4. The filtration device of claim 1 wherein the monolith structure exhibits a volume porosity ranging from about 25%–50%.

5. The filtration device of claim 1 wherein the monolith structure exhibits an average pore diameter of between about 0.1–10 micrometers.

6. The filtration device of claim 1 wherein the monolith structure exhibits an average pore diameter of between about 0.1–5 micrometers.

7. The filtration device of claim 1 wherein the monolith structure exhibits an average pore size diameter of between about 0.1–2 micrometers.

8. The filtration device of claim 1 wherein the monolith structure is comprised of glass, ceramic, glass-ceramic, organic polymer, metal, activated carbon or mixtures thereof.

9. The filtration device of claim 8 wherein the monolith structure is a ceramic material.

10. The filtration device of claim 9 wherein the ceramic is selected from the group consisting of cordierite, mullite, clay, talc, zircon, zirconia, zirconates, zirconia-spinel, magnesium alumino-silicates, spinel, alumina, silica, silicates, borides, alumino-silicates, such as, porcelains, zeolites, lithium alumino-silicates, alumina silica, feldspar, titania, fused silica, nitrides, borides, carbides, such as, silicon carbide, silicon nitride, or mixtures thereof.

11. A membrane device for receiving a feed stock and for separating the feed stock into filtrate and retentate, comprising:

a multicellular monolith structure having a central longitudinal axis and a peripheral surface and having inlet and outlet end faces and a matrix of porous walls defining a plurality of cells extending longitudinally and mutually parallel therethrough between the inlet and outlet end faces;

each of the cells exhibiting the same hydraulic diameter, a uniform transverse cross section throughout their length and a variable cross-section and shape when compared to at least one of the other cells;

the cells advancing in at least one direction from the central longitudinal axis towards the peripheral surface exhibiting an increasing aggregate wall thickness; and, a permselective membrane applied to the surface of the cells.

12. The membrane device of claim 11 wherein cells advancing in all directions from the central longitudinal axis towards the peripheral surface, exhibit an increasing aggregate wall thickness.

13. The membrane device of claim 11 wherein the monolith structure is cylindrical and comprised of a matrix of radially-extending and circumferential porous walls with each of the radially-extending walls exhibiting an increasing thickness as measured from the central longitudinal axis towards the peripheral surface and each successive circumferential wall exhibiting an increased thickness as the walls advance from the central longitudinal axis towards the peripheral surface.

14. The membrane device of claim 11 wherein the monolith structure exhibits a volume porosity ranging from about 25%–50%.

15. The membrane device of claim 11 wherein the monolith structure exhibits an average pore diameter of between about 0.1–10 micrometers.

16. The membrane device of claim 11 wherein the monolith structure exhibits an average pore diameter of between about 0.1–5 micrometers.

17. The membrane device of claim 11 wherein the monolith structure exhibits an average pore diameter of between about 0.1–2 micrometers.

18. The membrane device of claim 11 wherein the monolith structure is comprised of ceramic, glass, glass-ceramic, metal, organic polymer, activated carbon or mixtures thereof.

19. The membrane device of claim 11 wherein the monolith structure is a ceramic material.

20. The filtration device of claim 19 wherein the ceramic is selected from the group consisting of cordierite, mullite, clay, talc, zircon, zirconia, zirconates, zirconia-spinel, magnesium alumino-silicates, spinel, alumina, silica, silicates, borides, alumino-silicates, such as, porcelains, zeolites, lithium alumino-silicates, alumina silica, feldspar, titania, fused silica, nitrides, borides, carbides, such as, silicon carbide, silicon nitride, or mixtures thereof.

21. The membrane device of claim 11 wherein the permselective membrane is selected from the membranes suitable for cross-flow filtration, microfiltration, ultrafiltration, reverse osmosis, gas separations, pervaporation.

* * * * *